United States Patent
Peng

(12) 
(10) Patent No.: US 6,292,332 B1
(45) Date of Patent: Sep. 18, 2001

(54) COMPLIANT AIR BEARING SLIDER WITH WIDE MIDPOINT RAILS FOR RELIABLE PROXIMITY RECORDING

(75) Inventor: Jih-Ping Peng, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 745 days.

(21) Appl. No.: 08/611,657

(22) Filed: Mar. 6, 1996

Related U.S. Application Data

(60) Provisional application No. 60/009,940, filed on Jan. 16, 1996.

(51) Int. Cl.[7] ............................................. G11B 5/60
(52) U.S. Cl. .............................................. 360/236.8
(58) Field of Search .................................. 360/103, 102, 360/129

(56) References Cited

U.S. PATENT DOCUMENTS

| | | | |
|---|---|---|---|
| 4,555,739 | 11/1985 | Le Van et al. | 360/103 |
| 4,894,740 | 1/1990 | Chhabra et al. | 360/103 |
| 5,200,868 | 4/1993 | Chapin et al. | 360/103 |
| 5,212,608 | 5/1993 | Yoneoka | 360/103 |
| 5,267,104 | 11/1993 | Albrecht et al. | 360/97.02 |
| 5,287,235 | 2/1994 | Cunningham et al. | 360/103 |
| 5,396,386 | 3/1995 | Bolasna et al. | 360/103 |
| 5,430,591 | 7/1995 | Takeuchi et al. | 360/103 |
| 5,473,485 | 12/1995 | Leung et al. | 360/103 |
| 5,488,524 | 1/1996 | Cunningham | 360/103 |
| 5,490,025 | 2/1996 | Dorius et al. | 360/103 |

FOREIGN PATENT DOCUMENTS

| | | | | |
|---|---|---|---|---|
| 0600348 A2 | * | 6/1994 | (EP) | 360/103 |
| 2-53256 | | 2/1990 | (JP) . | |
| 3-12854 | * | 1/1991 | (JP) | 360/103 |
| 4-23283 | * | 1/1992 | (JP) | 360/103 A |

OTHER PUBLICATIONS

Research Disclosure, "Roll Insensitive Slider Design for Improved Disk File Reliability," Nov. 1985.

* cited by examiner

Primary Examiner—George J. Letscher
(74) Attorney, Agent, or Firm—Westman, Champlin & Kelly, P.A.

(57) ABSTRACT

A proximity recording slider has a slider body with a leading edge, a trailing edge and a length measured from the leading edge to the trailing edge. First and second longitudinal bearing surfaces are positioned on the slider body and have a leading portion, a trailing portion and a waist portion. The waist portion of at least one of the bearing surfaces is wider than the leading and trailing portions and has a maximum width at a position that is between about ¼ to ¾ the length of the slider body.

14 Claims, 7 Drawing Sheets

COMPLIANT AIR BEARING SLIDER WITH WIDE MIDPOINT RAILS FOR RELIABLE PROXIMITY RECORDING

CROSS REFERENCE TO RELATED APPLICATION

Priority is hereby claimed from copending Provisional Application U.S. Ser. No. 60/009,940, which was filed Jan. 16, 1996.

BACKGROUND OF THE INVENTION

The present invention relates to a disc drive data storage device and, more particularly, to a disc drive having a compliant air bearing slider for proximity recording.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry. The actuator mechanism includes a track accessing arm and a load beam for each head gimbal assembly. The load beam provides a preload force which urges the head gimbal assembly toward the disc surface.

The head gimbal assembly includes a hydrodynamic (e.g. air) bearing slider and a gimbal. The gimbal is positioned between the slider and the load beam to provide a resilient connection that allows the slider to pitch and roll while following the topography of the disc. A conventional catamaran slider includes a pair of raised side rails which face the disc surface and form air bearing surfaces. As the disc rotates, the disc drags air under the slider along the air bearing surfaces in a direction approximately parallel to the tangential velocity of the disc. As the air passes beneath the side rails, skin friction on the air bearing surfaces causes the air pressure between the disc and the air bearing surfaces to increase which creates a hydrodynamic lifting force that causes the slider to lift and fly above the disc surface. The preload force supplied by the load beam counteracts the hydrodynamic lifting force. The preload force and the hydrodynamic lifting force reach an equilibrium based upon the hydrodynamic properties of the slider and the speed of rotation of the disc.

Flying height is viewed as one of the most critical parameters of contact and non-contact recording. As the average flying height of the slider decreases, the transducer achieves greater resolution between the individual data bit locations on the disc. Therefore, it is desirable to have the transducers fly as close to the disc as possible. Flying height is preferably uniform regardless of variable flying conditions, such as tangential velocity variation from inside to outside tracks, lateral slider movement during seek operations and air bearing skew angles.

A catamaran slider develops four pressure peaks at the four corners of the slider. The pressure peaks at the leading edge are produced by a leading edge taper. The pressure peaks at the trailing edge are produced by a low clearance between the side rails and the disc surface. Such a design generates a very stiff air bearing in the pitch and roll directions, and a tight flying height distribution is achieved.

Several enhancements have been made to the traditional catamaran slider. U.S. Pat. No. 5,062,017 discloses a slider having hourglass-shaped air bearing surfaces which are wide at the leading and trailing edges and narrow in the middle. The hourglass shapes move more pressure to the four corners of the slider and provide a more even pressure distribution over various skew angles. The slider therefore has a flying height that is relatively skew insensitive. U.S. Pat. No. 5,287,235 discloses an air bearing slider having truncated side rails and a full length center rail. This slider produces three pressure peaks, two of which are located at the corners of the leading edge. The third is located at the center of the slider along the trailing edge. These sliders are appropriate for traditional contact-start-stop types of interfaces because high pitch and roll stiffness result in a smaller flying height variability.

However, these sliders are not well-suited for recording applications where continuous contact occurs. Flying height has recently been reduced significantly from over 10 microinches to less than one microinch in order to achieve a high aerial density of information on the disc surface. With less than 1 microinch separation between the head and the disc, the recording head and media are in contact with one another even at full disc speed. This operation is referred to as "contact" or "proximity" recording. An advantage of proximity recording is that the head-disc separation is solely determined by the media glide avalanche height. Media glide avalanche height is the average flying height after the slider and the disc asperity have worn in over time. With a very low flying height, an optimal magnetic performance can be achieved. A disadvantage of proximity recording is that continuous contact may produce excessive wear or even catastrophic failure.

With conventional contact-start-stop technology, contact occurs between the head and disc only during startup and shut down of the disc drive. During normal operation, the head and disc are separated by a very thin air bearing, and contact does not occur. In this type of application, a stiff air bearing is preferred, since a stiff air bearing has a flying height that is less sensitive to suspension preload, pitch static angle and roll static angle, and has a tight flying height distribution over the disc surface.

With proximity recording, the contact force should be limited to an acceptable range. Although the contact force approaches zero asymptotically since the slider and disc interface wears in over time, catastrophic failure can be caused by a large initial contact force before the interface has had a chance to wear in.

U.S. Pat. No. 5,473,485 discloses a slider having truncated side rails and a rear center pad. Although this slider is less stiff than a traditional catamaran or hourglass-type slider, it requires a very deep recess, such as greater than 20 microns, to limit slider roll about its center line. With a more shallow recess step, when the slider flies at skew with respect to the disc tangential velocity, air flowing across the recess becomes prepressurized before being transferred to the downstream rail. The upstream rail is pressurized by ambient air. This causes an uneven pressure distribution between the side rails, which in turn causes slider roll.

Although a deep recess reduces slider roll, a deep recess is less desirable to manufacture. Ion milling or other etching processes for such a deep recess are very costly and time consuming. As a result, a deep recess is usually produced by a grinding process in mass production. A typical grinding process for such a slider requires several steps of machining and requires blending or rounding of the rail edges. Variabilities in these fabrication steps make a wide flying height distribution among individual sliders. In addition, design flexibility is greatly constrained by the grinding process.

SUMMARY OF THE INVENTION

The slider of the present invention has a slider body with a leading edge, a trailing edge and a length measured from the leading edge to the trailing edge. First and second longitudinal bearing surfaces are positioned on the slider body and have a leading portion, a trailing portion and a waist portion. The waist portion of at least one of the bearing surfaces is wider than the leading and trailing portions and has a maximum width at a position that is between about ¼ to ¾ the length of the slider body. The wide waist portions provide a very compliant bearing which is particularly useful for reliable proximity recording.

BRIEF DESCRIPTION OF THE DRAWINGS

FIG. 4b is a graph illustrating pressure distribution on the slider shown in FIG. 4a.

DETAILED DESCRIPTION OF THE PREFERRED EMBODIMENTS

Figure 1:
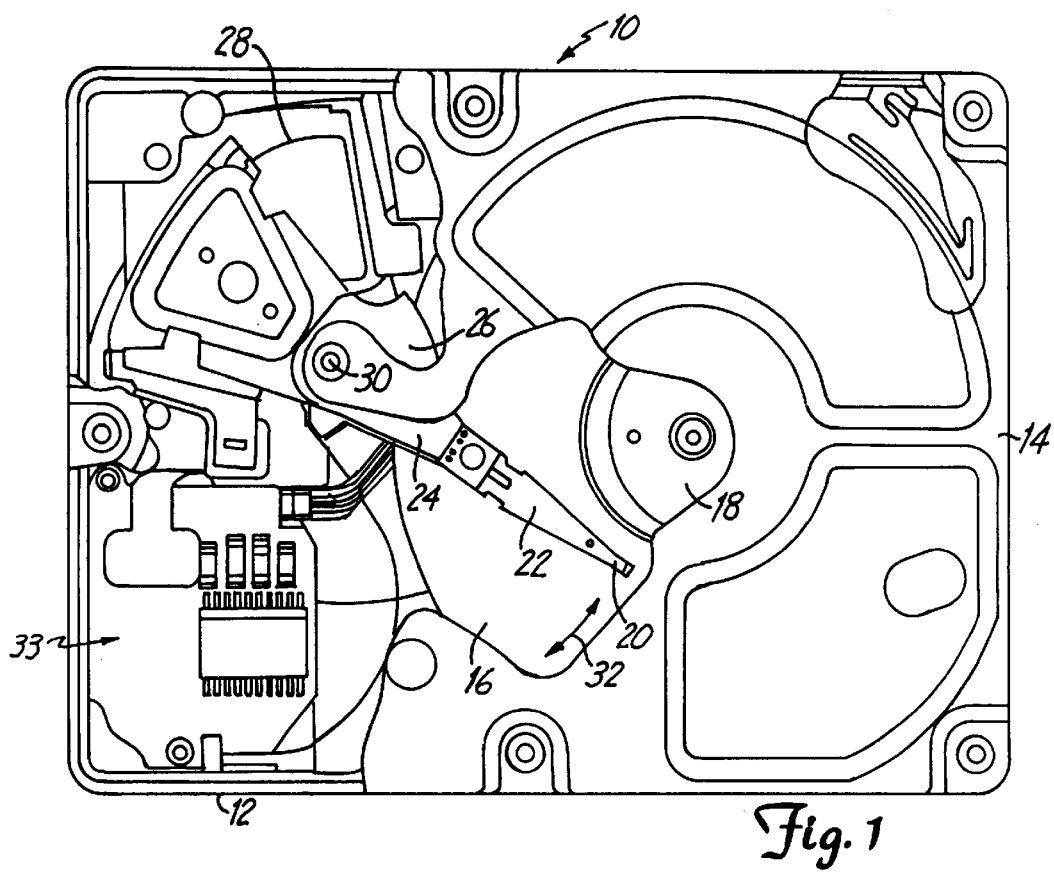
FIG. 1 is a top plan view of a disc drive data storage device, in accordance with the present invention.

The slider of the present invention has wide mid-point side rails for compliant, reliable proximity recording. FIG. 1 is a plan view of a typical disc drive 10 in which the present invention is useful. Disc drive 10 includes a housing with a base 12 and a top cover 14 (portions of top cover 12 are removed for clarity). Base 12 is combined with top cover 14 to form a sealed environment to protect internal components from contamination from outside the sealed environment. Disc drive 10 further includes a disc pack 16 which is mounted on a spindle motor (not shown) by a disc clamp 18. Disc pack 16 includes a plurality of individual discs which are mounted for co-rotation about a central axis. Each disc surface has an associated head gimbal assembly (HGA) 20 which is mounted to disc drive 10 for communicating with the disc surface. In the example shown in FIG. 1, HGA's 20 are supported by load beam flexures 22 which are in turn attached to track accessing arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached heads 20 about a pivot shaft 30 to position heads 20 over a desired data track along an arcuate path 32 under the control of electronic circuitry 33.

While a rotary actuator is shown in FIG. 1, the present invention is also useful in disc drives having other types of actuators, such as linear actuators.

Figure 2:
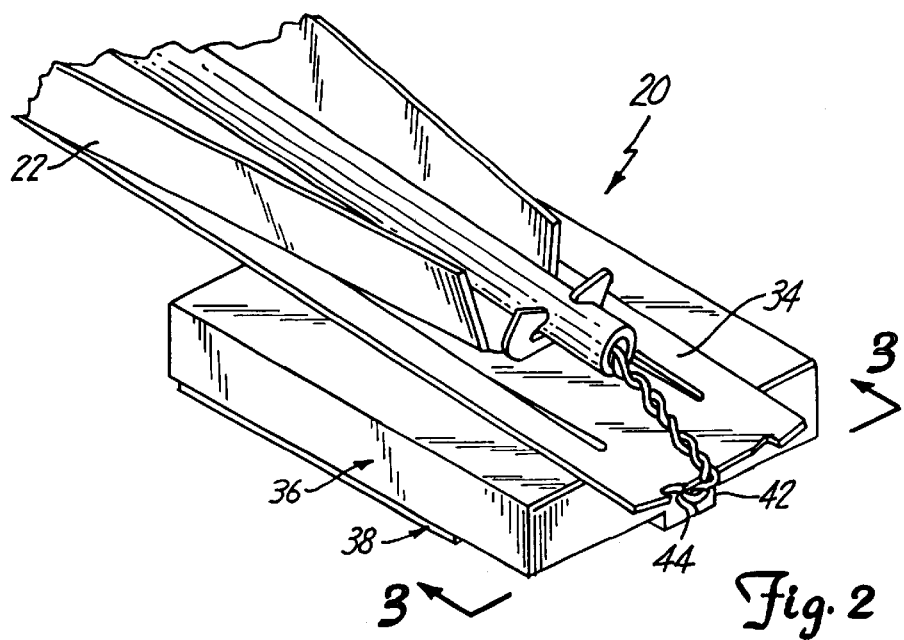
FIG. 2 is a perspective view of a head gimbal assembly in accordance with the present invention.
Figure 3:
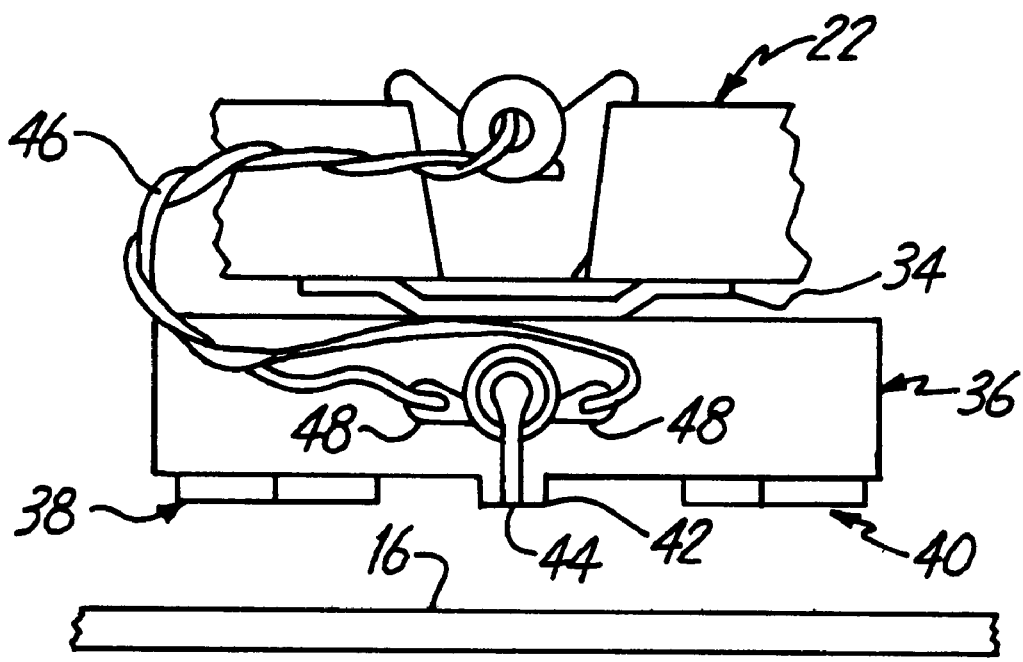
FIG. 3 is an end view of the head gimbal assembly taken along line 3—3 of FIG. 2.

FIGS. 2 and 3 show head gimbal assembly 20 in greater detail. FIG. 2 is a perspective view of head gimbal assembly 20 supported by load beam flexure 22. FIG. 3 is an end view of head gimbal assembly 20 taken along line 3—3 of FIG. 2. Load beam 22 provides a preload force which urges head gimbal assembly 20 toward the disc surface. Assembly 20 includes a gimbal 34 and a slider 36. Gimbal 34 is positioned between slider 36 and load beam 22 to provide a resilient connection that allows the slider to follow the topography of the disc. Slider 36 is connected to gimbal 34 in a known manner, such as with an adhesive. Gimbal 34 includes a dimple (not shown) that is in point contact with slider 36. The dimple provides pivot about which slider 30 can pitch and roll while following the topography of disc 16.

Slider 36 includes first and second raised side rails 38 and 40, raised center pad 42 and transducer 44. Transducer 44 is mounted to a trailing end of center pad 42. Transducer 44 is electrically coupled to leads 46 at bonding pads 48. Transducer 44 communicates with individual bit positions on the surface of disc 16 as they pass beneath slider 36. Transducer 44 can include a thin film or magnetoresistive magnetic head, for example. The number of conductors and bonding pads depends on the number of conductors required for the particular head that is carried by slider 36.

Figure 4A:
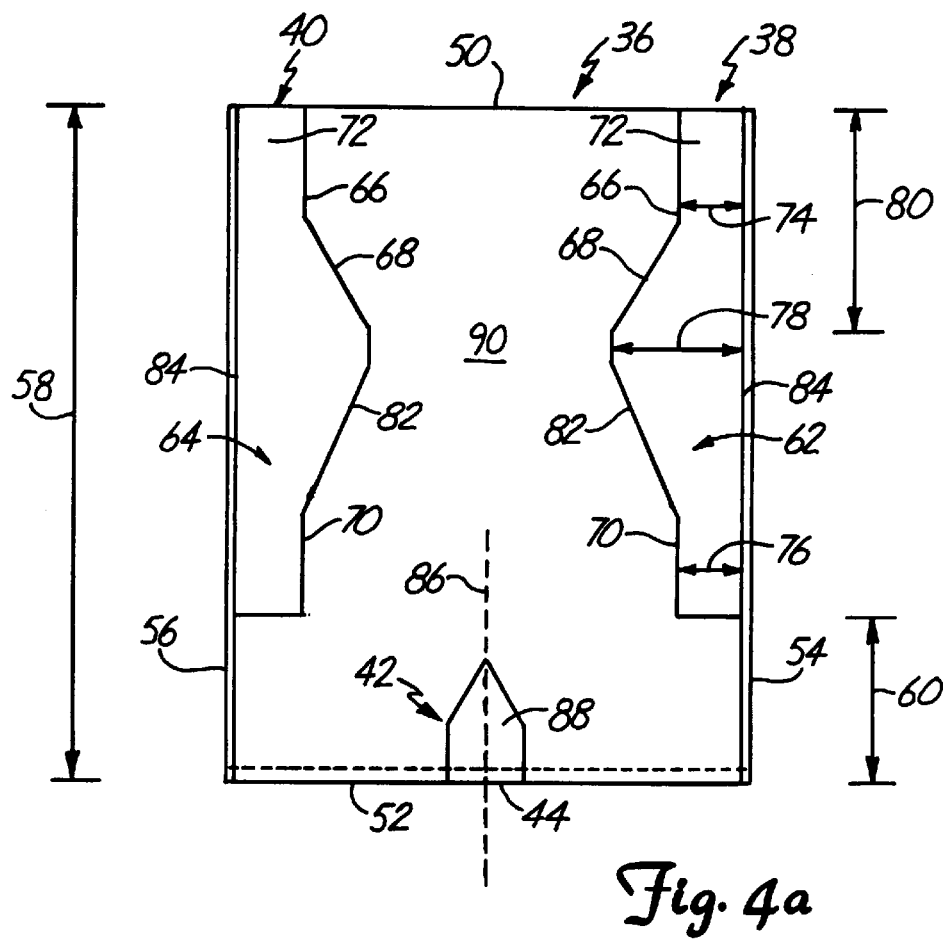
FIG. 4a is a bottom plan view of a proximity recording disc head slider, according to the present invention.

FIG. 4a is a bottom plan view of slider 36, as seen from the surface of disc 16. Slider 36 has a leading edge 50, a trailing edge 52, side edges 54 and 56 and a length 58 which is measured from leading edge 50 to trailing edge 52. Side rails 38 and 40 extend along side edges 54 and 56, respectively, from leading edge 50 toward trailing edge 52. Side rails 38 and 40 terminate a distance 60 prior to trailing edge 52. In one embodiment, length 58 is 80 mils and distance 60 is 20 mils. Distance 60 preferably ranges between 5 and 25 mils.

Side rails 38 and 40 form longitudinal bearing surfaces 62 and 64, respectively. Bearing surfaces 62 and 64 have a leading portion 66, a waist portion 68 and a trailing portion 70. Leading portion 66 includes a leading taper 72. Leading portion 66 and trailing portion 70 have widths 74 and 76, respectively. Widths 74 and 76 may be equal to one another or different from one another. Waist portion 68 widens from leading portion 66 to a maximum width 78 and then narrows from maximum width 78 to trailing portion 70. Maximum width 78 is greater than widths 74 and 76 and is positioned at a distance 80 from leading edge 50. A ratio of widths 74 and 76 to maximum width 78 is preferably 0.2 to 0.8 and most preferably 0.3 to 0.4. In one embodiment, the ratio is 0.37.

Bearing surfaces 62 and 64 have an inside edge 82 and an outside edge 84. In the embodiment shown in FIG. 4a, inside edge 82 has a generally convex shape along waist section 68 and outside edge 84 is substantially straight. In alternative embodiments (not shown), outside edge 84 has a convex or a concave shape. Other inside and outside edge shapes can also be used. Bearing surfaces 62 and 64 preferably have substantially the same dimensions and are symmetric with one another about a slider center line 86. In another alternative embodiment, only one of the side rails 38 and 40 has a wide waist portion 68.

Distance 80 is preferably between about ¼ to ¾, more preferably between about ⅓ to ¾, and most preferably between about ⅓ to ½ the length 58 of slider 36. In these ranges, maximum width 78 is positioned about or slightly forward of the slider midpoint. Air is pressurized by leading taper 72 and then enters the wide area in waist portion 68. Most of the high pressure developed on waist portion 68 leaks along inside edge 82 before entering the narrow trailing portion 70. Therefore, more air with high pressure concentrates at the slider midpoint and does not contribute to pitch stiffness. Thus, the hydrodynamic features of slider 36 provide a very compliant air bearing which is particularly useful for proximity recording.

Center pad 42 is positioned at trailing edge 52 between side edges 54 and 56. Center pad 42 is preferably positioned along center line 86. Center pad 42 forms a bearing surface 88 which develops additional positive pressure at trailing edge 52 and forms a surface on which to mount transducer 44.

A recessed area 90 is defined between side rails 38 and 40 and extends from leading edge 50 to trailing edge 52. Recessed area 90 preferably has a relatively shallow depth, such as 5 microns, as measured from bearing surfaces 62 and 64. Recessed area 90 can be formed by grinding, ion milling, etching or other methods of manufacture. The shallow depth allows a more sophisticated air bearing surface pattern to be etched in a reasonable time at a reasonable cost.

Figure 4B:
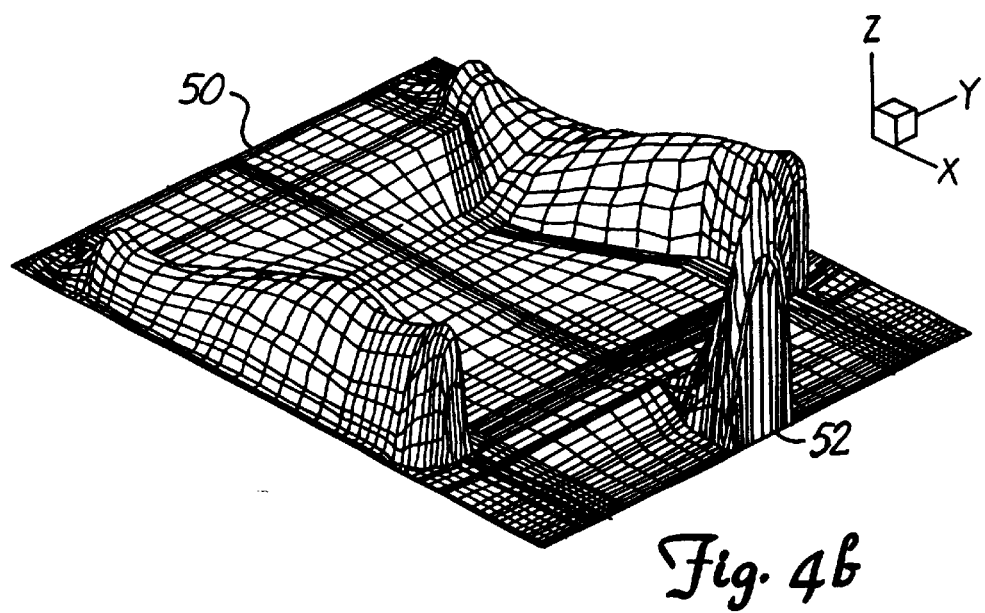

FIG. 4b is a computer generated three-dimensional graph illustrating pressure distribution on slider 36 during operation, as modeled by a finite element simulator. Peak pressure developed on bearing surfaces 62 and 64 is concentrated at a midpoint on the slider, as opposed to being concentrated at the leading and trailing edges 50 and 52 as in sliders of the prior art.

Figure 5:
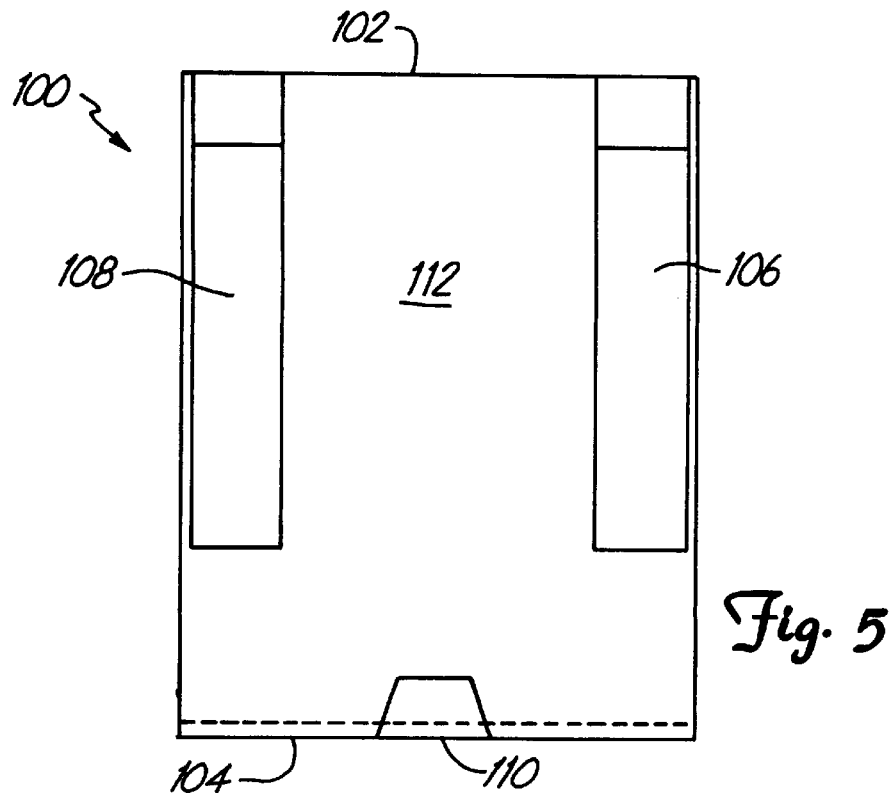
FIG. 5 is a bottom plan view of a tripad air bearing slider.
Figure 6A:
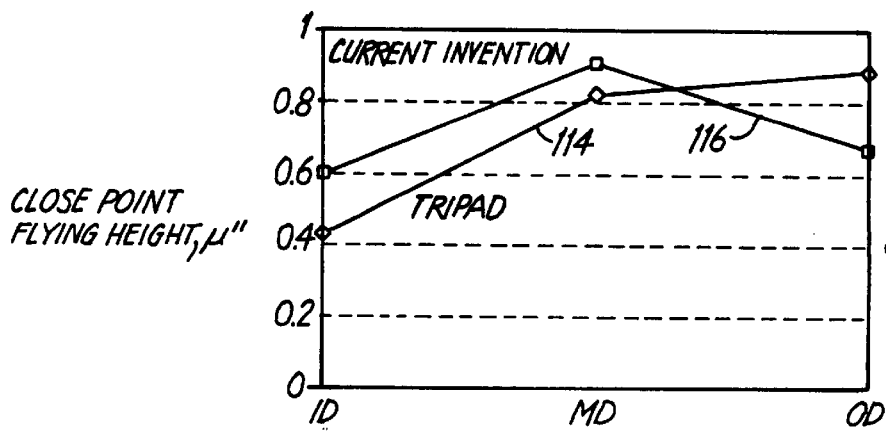
FIGS. 6a–6c are graphs illustrating flying characteristics of the sliders shown in FIGS. 4a and 5.

The flying characteristics of the slider shown in FIG. 4a were compared with the flying characteristics of a "tripad" slider, which is shown in FIG. 5. Tripad slider 100 has a leading edge 102, a trailing edge 104, truncated side rails 106 and 108, and rear center pad 110. Close point flying height is shown in FIG. 6a. The close point flying height was measured in microinches at the inner diameter (ID), the middle diameter (MD) and the outer diameter (OD) of a 2.5 inch disc. Both sliders were designed such that the maximum flying heights between the ID and the OD were 0.9 microinches. Line 114 represents the close point flying height of slider 100. Line 116 represents the close point flying height of slider 36. Slider 100 has a high rising profile, which increases from 0.43 microinches at the ID to 0.88 microinches at the MD. In contrast, slider 36 of the present invention has a much lower rising profile. The close point flying height of slider 36 increases from 0.59 microinches at the ID to 0.9 microinches at the MD, with a range of only 0.31 microinches.

Figure 6B:
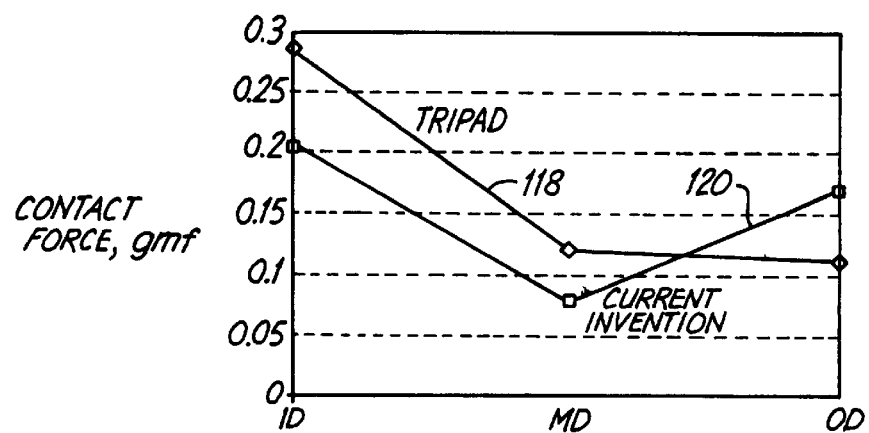

Slider-to-disc contact force is shown in FIG. 6b. The contact force was calculated by a quasi-Newton model. Line 118 represents the contact force of slider 100. Line 120 represents the contact force of slider 36. Contact force is greatly reduced with the slider of the present invention.

Figure 6C:
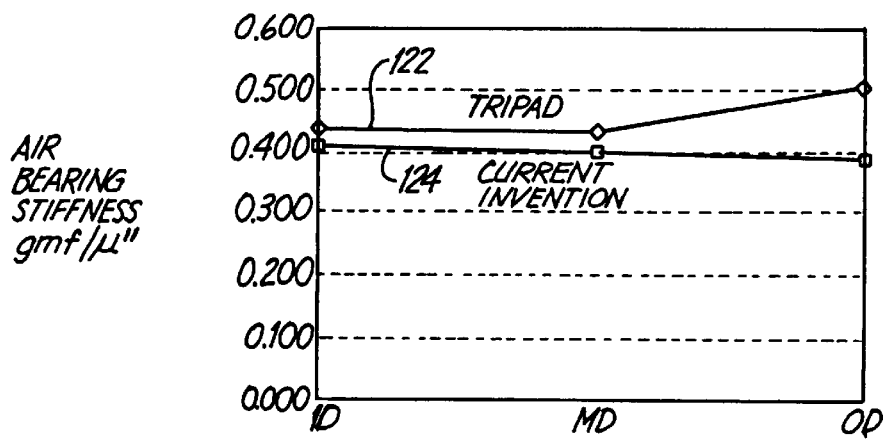

Air bearing stiffness at the contact point is shown in FIG. 6c. Air bearing stiffness is defined as the contact force divided by the interference. Line 122 represents the air bearing stiffness of slider 100. Line 124 represents the air bearing stiffness of slider 36. Because of the wide midpoint on the side rails, the slider of the present invention is much less stiff than the tripad slider shown in FIG. 5 and is therefore more compliant.

A disadvantage of the slider shown in FIG. 4a is that the shallow recess depth causes the slider to have a relatively large roll at large skew angles. At large skew angles, the air travels across the shallow recess and becomes prepressurized before pressurizing the downstream rail. This is known as a "step bearing effect." The upstream rail is pressurized by ambient air. This causes an unequal pressure distribution between the downstream and upstream rails, which causes roll. A large roll angle can cause the rail that has a lower flying height to contact the disc surface before the rear center pad contacts the disc surface.

Figure 7:
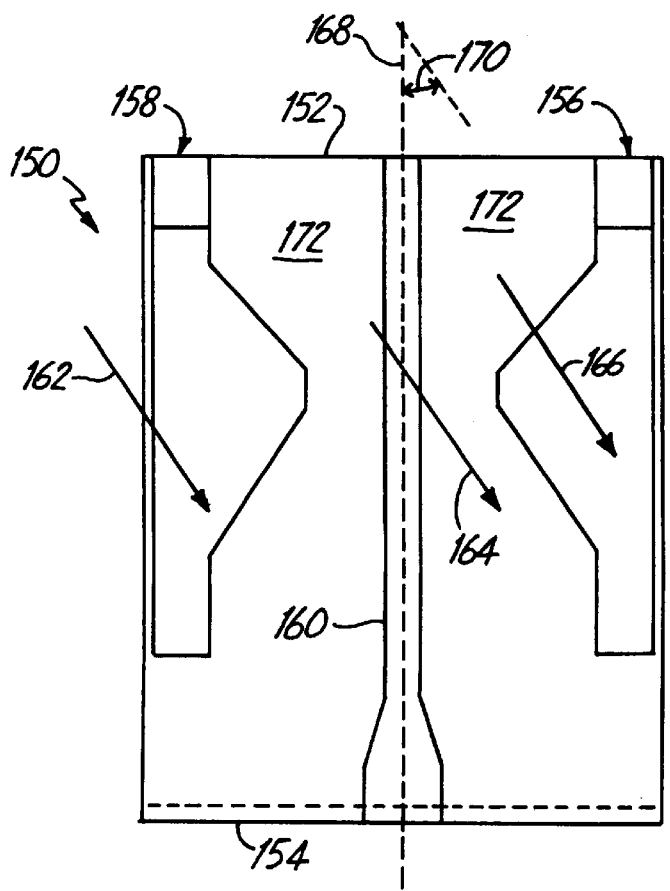
FIG. 7 is a bottom plan view of a proximity recording disc head slider having a full-length center rail, according to the present invention.

In order to correct the roll, a full length center rail is added, as shown in FIG. 7. Slider 150 includes leading edge 152, trailing edge 154, side rails 156 and 158, and center rail 160. Lines 162, 164 and 166 represent air flow across slider 150 when the slider flies with its center line 168 at a skew angle 170 with respect to the disc tangential velocity. Air flow 162 is at ambient pressure before pressurizing upstream rail 158. Airflow 164 and 166 passes beneath center rail 160 before pressurizing downstream rail 156. A small amount of subambient pressure is generated by center rail 160 at the downstream side of the rail. Shallow recess 172 then pressurizes the subamient air before it reaches downstream rail 156. The subambient pressure effect generated by center rail 160 therefore balances the step bearing effect caused by the shallow recess. Slider 150 has a very small roll angle over a wide range of skew angles.

Figure 8A:
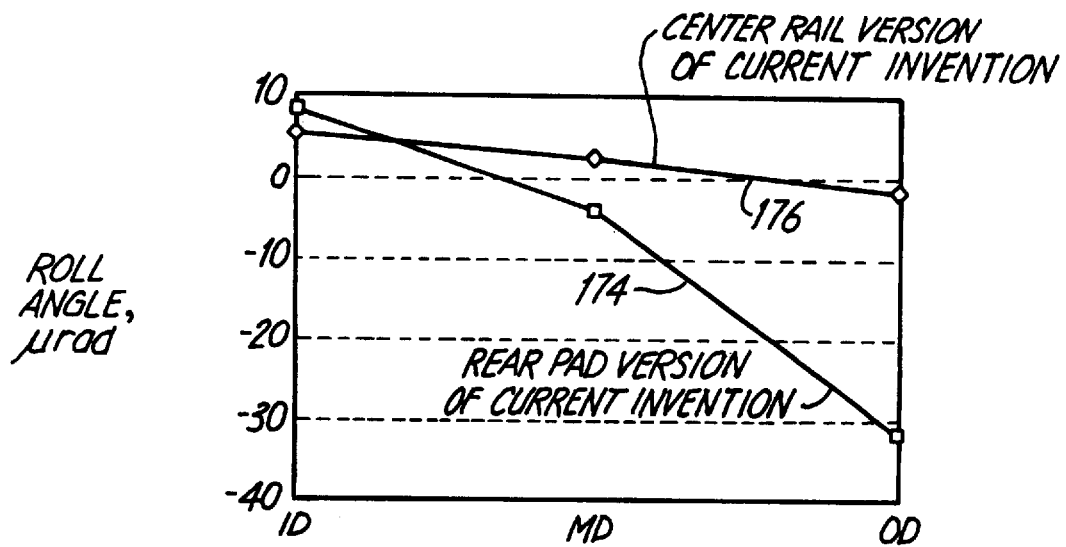
FIGS. 8a and 8b are graphs illustrating flying characteristics of the slider shown in FIG. 7.
Figure 8B:
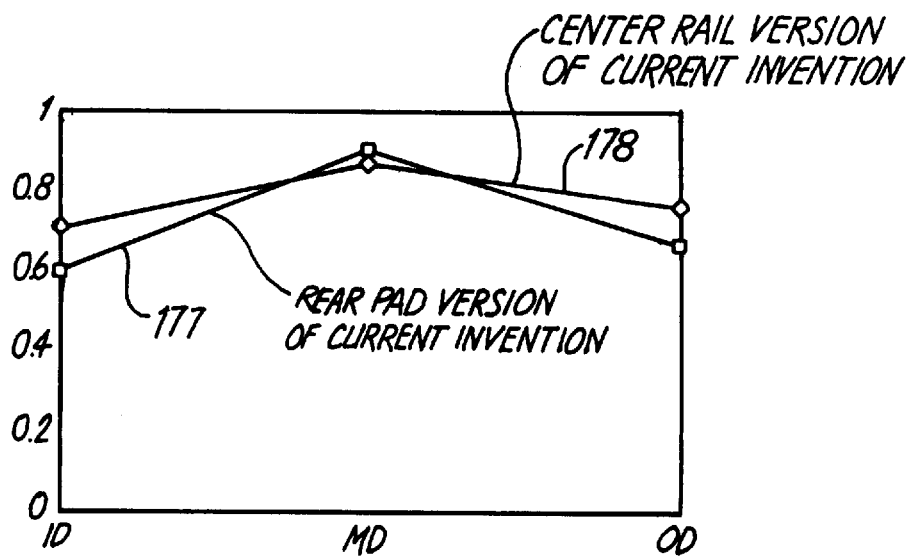

FIGS. 8a and 8b compare roll angle and close point flying height for the sliders shown in FIGS. 4a and 7. In FIG. 8a, line 174 represents the roll angle of slider 36 from the ID to the OD of the disc. Line 176 represents the roll angle of slider 150. The maximum absolute value of the slider roll angle is reduced over the entire disc radius range with slider 150 as compared to slider 36. In line 174, the maximum absolute value of the slider roll angle is 32 microradians at the OD. In line 176, the maximum absolute value of the slider roll angle is 5.4 microradians at the ID.

In FIG. 8b, line 177 represents the close point flying height of slider 36. Line 178 represents the close point flying height of slider 150. The overall flying height profile is also improved with slider 150 as compared to slider 36. Slider 150 has a flying height profile range of 0.16 microinches as compared to 0.31 microinches for slider 36.

Figure 9:
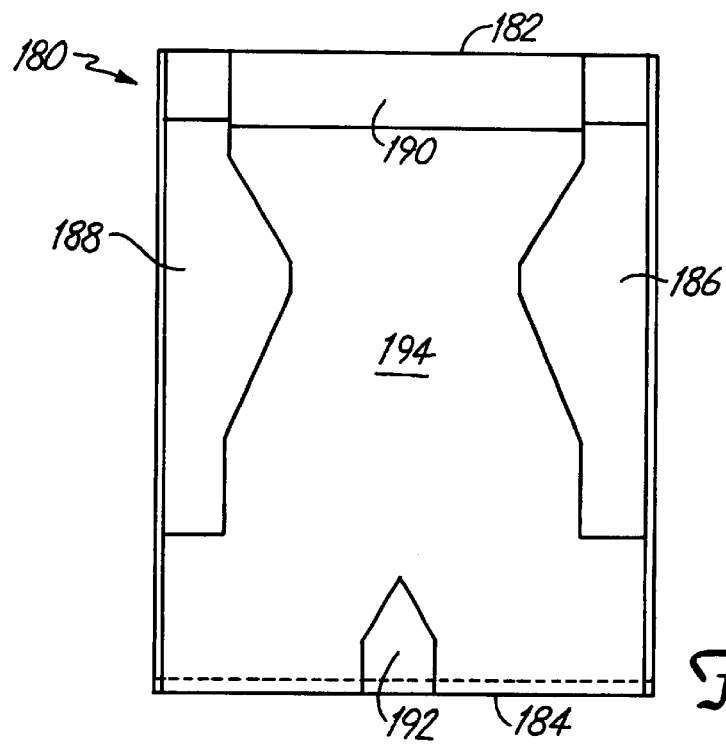
FIG. 9 is a bottom plan view of a proximity recording disc head slider having a cross rail, according to the present invention.

FIG. 9 is a bottom plan view of another alternative embodiment of the present invention. Slider 180 includes leading edge 182, trailing edge 184, side rails 186 and 188, cross rail 190 and rear pad 192. Cross rail 190 is positioned at leading edge 182 and extends between side rails 186 and 188. Cross rail 190 is preferably recessed from side rails 186 and 188 by about 1.0 microns, for example. Cross rail 190 defines a subambient pressure cavity 194 between side rails 186 and 188. Subambient pressure developed in the subambient pressure cavity counteracts positive pressure developed along the side rails resulting in a very low flying height variation from the disc ID to the disc OD.

Figure 10:
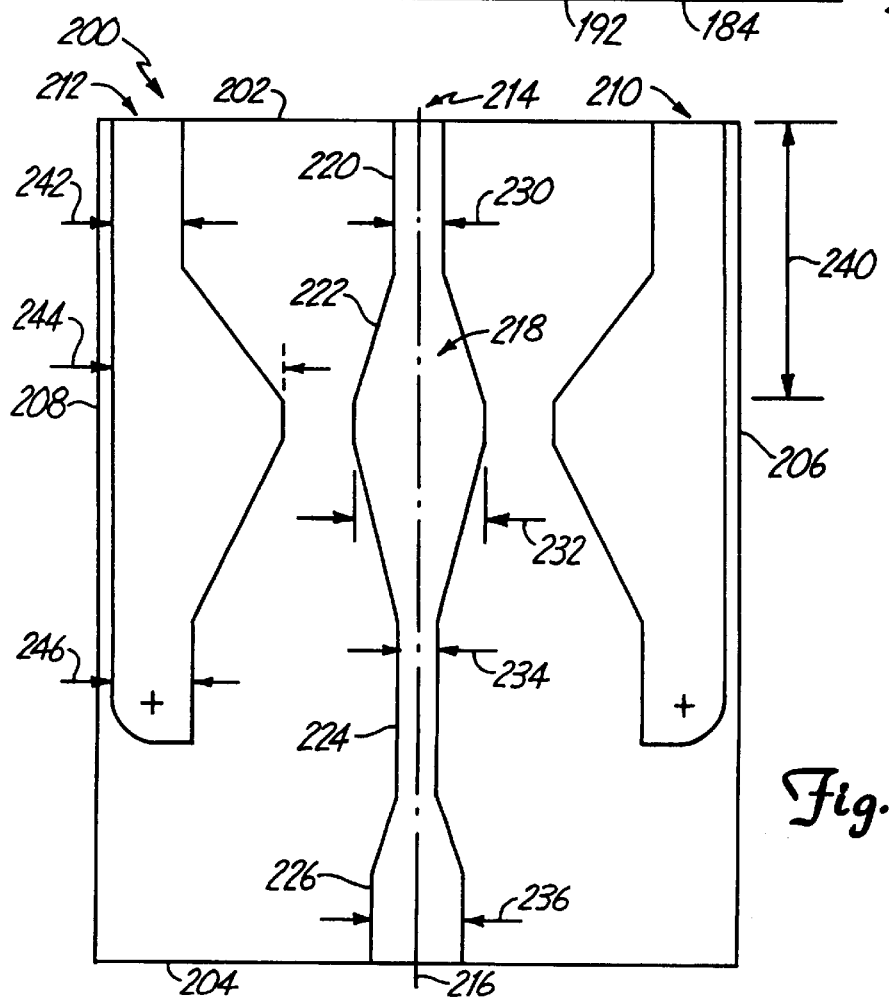
FIG. 10 is a bottom plan view of a proximity recording disc head slider having a wide midpoint center rail, according to the present invention.

FIG. 10 is a bottom plan view of a proximity recording disc head slider having a wide midpoint center rail, according to the present invention. Slider 200 has leading and trailing edges 202 and 204, first and second side edges 206 and 208, first and second side rails 210 and 212 and center rail 214. Center rail 214 is positioned between side rails 210 and 212 and preferably along slider center line 216. Center rail 214 has a bearing surface 218 with a narrow leading portion 220, a wide waist portion 222, a narrow ankle portion 224 and a wide trailing portion 226, which have widths 230, 232, 234 and 236, respectively. Width 232 at waist portion 222 is wider than widths 230 and 236 at leading and trailing portions 220 and 226. The maximum width of waist portion 222 is located a distance 240 from leading edge 202, which is preferably the same distance at which the widest point of side rails 210 and 212 are located from leading edge 202, as discussed above with respect to FIG. 4a. In one embodiment, width 230 is 5.0 mils, width 232 is 13.0 mils, width 234 is 4.0 mils and width 236 is 9.0 mils. Side rails 210 and 212 have a width 242 of 7.0 mils, a width 244 of 17.0 mils and a width 246 of 8.0 mils.

The slider of the present invention has one or more side rails with a wider surface area close to the midpoint of the rail. This produces a more compliant air bearing for reliable proximity recording. The slider has a low stiffness, a small flying height variability and a flat flying height profile over the disc radius. In addition, the slider has a low manufacturing cost and a high design flexibility.

The low stiffness limits the contact force of the slider to an acceptable range. A low contact force on the disc surface is an important feature in proximity recording since it reduces wear. According to Hook's law, applied force is equal to spring rate multiplied by displacement, or $$F = K \times x$$

In the present application, F is the contact force, K is the stiffness and x is a measure of the difference between the media glide avalanche height and the slider flying height on a smooth disc. For a given slider-disc interference, the contact force is therefore proportional to the hydrodynamic bearing stiffness.

A small flying height variability is also important in proximity recording. With proximity recording, an increase in flying height causes an electrical degradation by increasing the clearance between the transducer and the disc surface, which results in lower resolution. A decrease in flying height causes a mechanical degradation by increasing the contact force without increasing resolution since the slider is already in contact with the disc surface. The slider of the present invention has a very low flying height variability.

The flying height profile over the entire disc radius range is also improved with the slider of the present invention. It is a common misconception that the flying height profile (on a smooth disc) is not important for a proximity recording bearing since the slider-disc separation is equal the media glide avalanche height (on an actual rough disc). While this is correct from an electrical performance point of view, it is incorrect from a mechanical performance point of view. With a traditional slider, selecting a peak flying height in the profile for a required electric performance would cause the lowest flying height in the profile to produce a high interference with the disc, even with a nominal peak flying height. Over a 3–σ distribution range, the lowest flying height in the profile would likely create an unacceptable contact force or wear.

Although the present invention has been described with reference to preferred embodiments, workers skilled in the art will recognize that changes may be made in form and detail without departing from the spirit and scope of the invention. For example, the center pad and center rail can have a variety of lengths from the leading edge to the trailing edge and can have a variety of shapes. The side rails can also have a variety of lengths and shapes and are not required to be symmetrical.

What is claimed is:

1. A proximity recording rigid disc head slider comprising;
   a slider body having a leading edge, a trailing edge, first and second side edges and a length measured from the leading edge to the trailing edge;
   first and second longitudinal rails positioned on the slider body which form first and second longitudinal bearing surfaces having a leading portion, a trailing portion and a waist portion, wherein, the waist portion widens from the leading portion to a maximum rail width which is confined to a location between ⅓ to ⅔ the length of the slider body and narrows from the maximum rail width toward the trailing portion, and the trailing portion terminates prior to the trailing edge;
   first and second tapered surfaces formed within the first and second longitudinal rails, respectively, at the leading edge and having constant widths along the length of the slider body;
   a shallow recessed area positioned between the first and second longitudinal bearing surfaces and extending from the leading edge to the trailing edge;
   a raised center pad positioned at the trailing edge of the slider body between the first and second side edges; and
   a transducer mounted on the raised center pad.

2. The proximity recording rigid disc head slider of claim 1 wherein the shallow recessed area has a depth measured from the first and second longitudinal bearing surfaces that is no greater than about 5.0 microns.

3. The proximity recording rigid disc head slider of claim 2 wherein the maximum rail width is confined to a location between about ⅓ to ½ the length of the slider body.

4. The proximity recording rigid disc head slider of claim 1 wherein:
   the first and second longitudinal bearing surfaces extend along the first and second side edges, respectively, and have an inside edge and an outside edge; and
   the outside edge of each bearing surface is substantially straight.

5. The proximity recording rigid disc head slider of claim 1 wherein:
   the first and second longitudinal bearing surfaces extend along the first and second side edges, respectively, and have an inside edge and an outside edge; and
   the inside edge of each bearing surface has a generally convex shape along the waist section.

6. The proximity recording rigid disc head slider of claim 1 wherein a ratio of the widths of the leading and trailing portions to the maximum rail width is about 0.2 to 0.8.

7. The proximity recording rigid disc head slider of claim 1 wherein the first and second longitudinal bearing surfaces terminate 5–25 mils from the trailing edge.

8. The proximity recording rigid disc head slider of claim 1 wherein the raised center pad comprises:
   a third longitudinal bearing surface positioned between the first and second longitudinal bearing surfaces and extending between the leading edge and the trailing edge.

9. The proximity recording rigid disc head slider of claim 8 wherein the third longitudinal bearing surface has a leading portion, a trailing portion and a waist portion, wherein the waist portion of the third bearing surface is wider than the leading and trailing portions of the third bearing surface and has a maximum width that is confined to a location between about ⅓ to ⅔ the length of the slider body.

10. The proximity recording rigid disc head slider of claim 1 wherein the first and second longitudinal bearing surfaces have substantially the same dimensions and are symmetric with one another.

11. A rigid disc head slider comprising;
   a slider body having a leading edge, a trailing edge and a length measured from the leading edge to the trailing edge, first, second and third longitudinal bearing surfaces positioned on the slider body, each bearing surface having a leading portion, a trailing portion and a waist portion, wherein the waist portion widens from the leading portion to a maximum rail width, which is confined between about ⅓ and ⅔ the length of the slider body, and then narrows from the maximum rail width toward the trailing portion;

shallow recessed areas positioned between the first, second and third longitudinal bearing surfaces and extending from the leading edge to the trailing edge; and a transducer supported by the third longitudinal bearing surface.

12. The rigid disc head slider of claim 11 wherein the third longitudinal bearing surface is positioned between the first and second longitudinal bearing surfaces and further comprises an ankle portion which extends between and is narrower than the leading and trailing portions of the third longitudinal bearing surface.

13. A disc drive comprising:

a housing;

a rigid disc mounted in the housing for rotation about a central axis, the disc having a recording surface;

a rotary track accessing arm supported over the recording surface; and a slider carried by the track accessing arm for communication with the recording surface, the slider comprising:

a slider body having a leading edge, a trailing edge and a length measured from the leading edge to the trailing edge;

first and second longitudinal bearing surfaces positioned on the slider body which have a shape that concentrates positive pressure, which is developed between the bearing surfaces and the recording surface as the recording surface rotates about the central axis, between ⅓ to ⅔ the length of the slider body;

a shallow recessed area positioned between the first and second bearing surfaces; and a third longitudinal bearing surface positioned within the shallow recessed area between the first and second longitudinal bearing surfaces and extending between the leading and trailing edges.

14. A rigid disc head slider comprising:

a slider body having a leading edge, a trailing edge, first and second side edge and length measured from the leading edge to the trailing edge;

first and second raised longitudinal side rails positioned generally along the first and second side edges, respectively;

a recessed area positioned between the first and second side rails and extending from the edge to the trailing edge; and a raised longitudinal center rail positioned within the recessed area, between the first and second side rails and having a bearing surface with a leading portion, a trailing portion and a waist portion, wherein the waist portion is wider than the leading and trailing portions and has a maximum width located between about ⅓ and ⅔ the length of the slider body.

* * * * *

UNITED STATES PATENT AND TRADEMARK OFFICE
CERTIFICATE OF CORRECTION

PATENT NO. : 6,292,332 B1
DATED : September 18, 2001
INVENTOR(S) : Jih-Ping Peng Page 1 of 1

It is certified that error appears in the above-identified patent and that said Letters Patent is hereby corrected as shown below:

Column 10,
Line 15, after "and" (second occurrence), insert -- a --.
Line 21, after "the" (first occurrence), insert -- leading --.

Signed and Sealed this

Fifth Day of November, 2002

Attest:

Attesting Officer

JAMES E. ROGAN
Director of the United States Patent and Trademark Office